United States Patent
Tang et al.

(10) Patent No.: US 11,409,101 B2
(45) Date of Patent: Aug. 9, 2022

(54) METHOD FOR DESIGNING FREEFORM SURFACE OFF-AXIAL THREE-MIRROR IMAGING SYSTEM

(71) Applicants: Tsinghua University, Beijing (CN); HON HAI PRECISION INDUSTRY CO., LTD., New Taipei (TW)

(72) Inventors: Rui-rui Tang, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 621 days.

(21) Appl. No.: 16/502,148

(22) Filed: Jul. 3, 2019

(65) Prior Publication Data
US 2020/0241288 A1 Jul. 30, 2020

(30) Foreign Application Priority Data
Jan. 25, 2019 (CN) .......................... 201910075356.4

(51) Int. Cl.
*G02B 27/00* (2006.01)
*G02B 17/06* (2006.01)

(52) U.S. Cl.
CPC ..... *G02B 27/0012* (2013.01); *G02B 17/0642* (2013.01)

(58) Field of Classification Search
CPC ............ G02B 27/0012; G02B 17/0642; G02B 13/18; G02B 13/27; G02B 13/0025; G02B 17/27; G02B 17/0012; H01L 27/14629; H04N 5/35721
See application file for complete search history.

(56) References Cited

U.S. PATENT DOCUMENTS

| 9,250,438 | B2 | 2/2016 | Yang et al. | |
|---|---|---|---|---|
| 9,524,565 | B2 * | 12/2016 | Zhu | G02B 27/0012 |
| 10,101,204 | B2 * | 10/2018 | Zhu | G02B 27/0012 |
| 10,133,062 | B2 * | 11/2018 | Zhu | G02B 19/0061 |
| 10,386,619 | B2 | 8/2019 | Zhu et al. | |
| 2007/0219760 | A1 * | 9/2007 | Yang | G02B 19/0033 703/1 |
| 2016/0170191 | A1 * | 6/2016 | Hou | G02B 27/0012 359/858 |
| 2016/0232257 | A1 * | 8/2016 | Zhu | G02B 17/0663 |
| 2016/0232718 | A1 * | 8/2016 | Zhu | G06T 19/20 |
| 2018/0210180 | A1 * | 7/2018 | Zhu | G02B 27/0012 |

FOREIGN PATENT DOCUMENTS

| TW | 201523019 | 6/2015 |
|---|---|---|
| TW | 201837526 | 10/2018 |

* cited by examiner

*Primary Examiner* — Bao Q Truong
(74) *Attorney, Agent, or Firm* — ScienBiziP, P.C.

(57) ABSTRACT

A method of designing an freeform surface off-axial three-mirror imaging system is provided. The method includes: establishing an initial system and T (T≥2) object-image relationships according to a design goal, and selecting M feature fields for each object-image relationship; using feature rays of the T object-image relationships to construct a freeform surface system by using the initial system; step (S3), the freeform surface system obtained in step (S2) is used as another initial system, using iterative process to reduce a deviation between actual intersection points and ideal target points of the feature rays and feature surfaces, iteratively reconstructing free-form surfaces in the free-form surface system.

15 Claims, 3 Drawing Sheets

METHOD FOR DESIGNING FREEFORM SURFACE OFF-AXIAL THREE-MIRROR IMAGING SYSTEM

CROSS-REFERENCE TO RELATED APPLICATIONS

The application is also related to copending applications entitled, "FREEFORM SURFACE OFF-AXIAL THREE-MIRROR IMAGING SYSTEM", filed on Jul. 3, 2019, with Ser. No. 16/502,138; "FREEFORM SURFACE OFF-AXIAL THREE-MIRROR IMAGING SYSTEM", filed on Jul. 3, 2019, with Ser. No. 16/502,144; "FREEFORM SURFACE OFF-AXIAL THREE-MIRROR IMAGING SYSTEM", filed on Jul. 3, 2019, with Ser. No. 16/502,147.

FIELD

The subject matter herein generally relates to a method of designing freeform surface off-axial three-mirror imaging systems.

BACKGROUND

Compared with conventional rotationally symmetric surfaces, freeform surfaces have asymmetric surfaces and more degrees of design freedom, which can reduce the aberrations and simplify the structure of the system. In recent years, freeform surfaces are often used in off-axial three-mirror imaging system.

Conventional freeform surface off-axial three-mirror imaging systems are mostly obtained by direct design method, for example, a partial differential equation (PDE) design method, a simultaneous multiple surface (SMS) method and a construction-iteration method (CI-3D). However, only a limited number of fields can be considered during a design process of conventional methods. There are limitations on designing freeform surface off-axial three-mirror imaging systems with multiple sets of object relationships.

BRIEF DESCRIPTION OF THE DRAWINGS

Implementations of the present technology will now be described, by way of embodiment, with reference to the attached figures, wherein.

DETAILED DESCRIPTION

Figure 1:
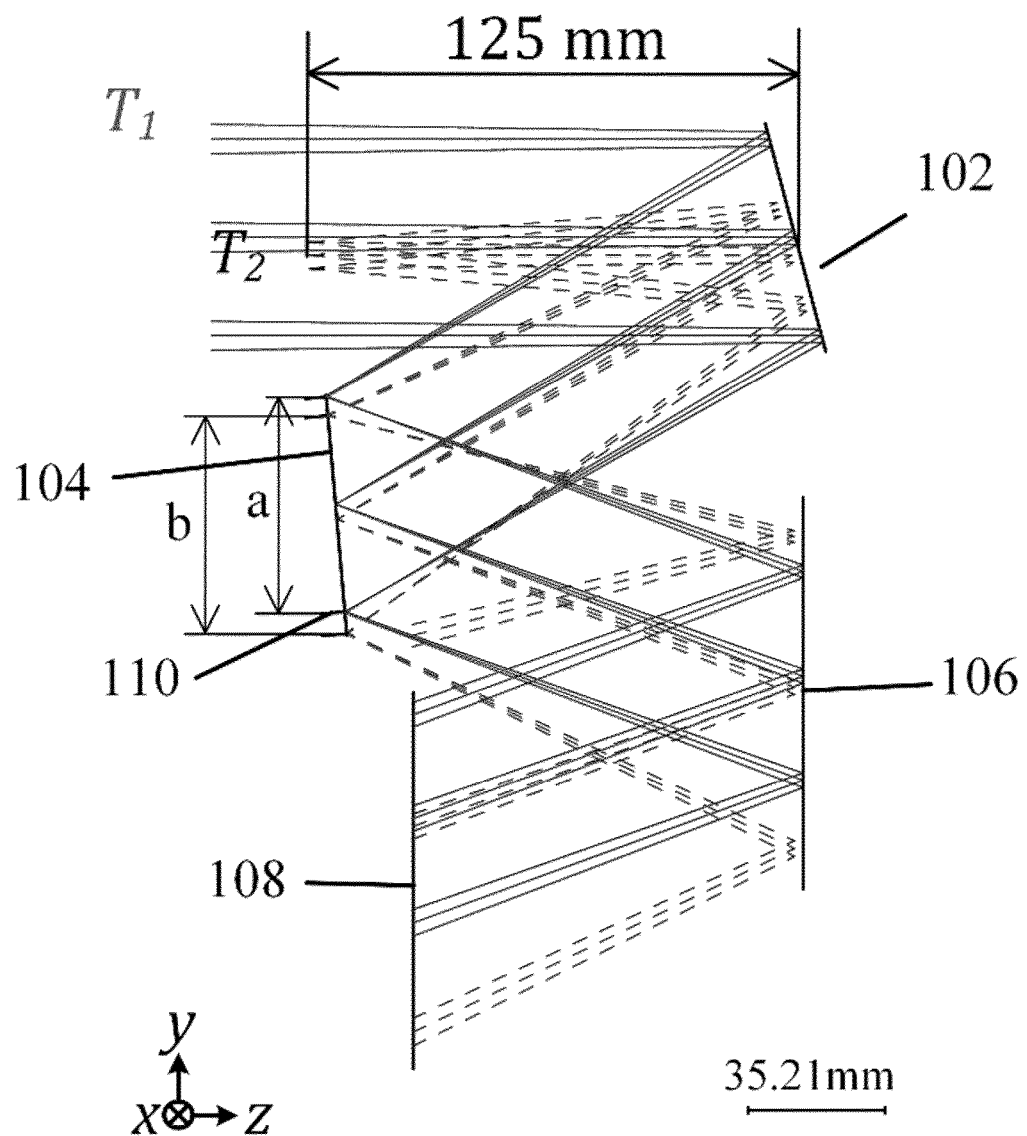
FIG. 1 is a schematic structural diagram of an initial plane system established in one embodiment.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "contact" is defined as a direct and physical contact. The term "substantially" is defined to be that while essentially conforming to the particular dimension, shape, or other feature that is described, the component is not or need not be exactly conforming to the description. The term "comprising," when utilized, means "including, but not necessarily limited to"; it specifically indicates open-ended inclusion or membership in the so-described combination, group, series, and the like.

A method of designing an freeform surface off-axial three-mirror imaging system according to one embodiment comprises the following steps:

step (S1), establishing an initial system and a plurality of object-image relationships according to a design goal, and selecting M feature fields for each object-image relationship;

step (S2), using feature rays of the T object-image relationships to construct a freeform surface system by using the initial system;

step (S3), the freeform surface system obtained in step S2 is used as another initial system, using iterative process to reduce a deviation between actual intersection points and ideal target points of the feature rays and feature surfaces, iteratively reconstructing free-form surfaces in the free-form surface system, and when an average RMS (root mean square) dispersion spot is no longer shrinking, the freeform surface off-axial three-mirror imaging system to be designed is obtained.

In step S1, the initial system comprises L initial surfaces, and the L initial surfaces are defined as $L_j$(j=1, 2, ... L). Each of the plurality of initial surfaces corresponds to one freeform surface of the freeform surface off-axial three-mirror imaging system. The plurality of initial surfaces can be planar surfaces or spherical surfaces. The locations of the plurality of initial surfaces can be selected according to the actual needs of the freeform surface off-axial three-mirror imaging systems. The number of the plurality of initial surfaces can be selected according to the actual needs. Referring to FIG. 1, in one embodiment, the initial system is an initial planar three-mirror imaging system, the initial planar three-mirror imaging system comprises an initial primary mirror 102, an initial secondary mirror 104, an initial tertiary mirror 106 and an aperture 110. Each of the initial primary mirror 102, the initial secondary mirror 104, the initial tertiary mirror 106 comprises an initial plane. The aperture 110 is located on a surface of the initial secondary mirror 104. The aperture 110 is capable of moving from a first location 104a and a second location 104b on the surface of the initial secondary mirror 104.

The object-image relationship refers to a positional relationship between an object and its image. A number of the plurality of object-image relationships is T, T is greater than or equal to 2, that is, T≥2. That is, T object-image relationships are established. In different object-image relationships, an aperture of the freeform surface off-axial three-mirror imaging system can be moved to different positions to achieve different imaging light selections, and then switch different image relationships. In this embodiment, two object-image relationships are selected, the T1 object-image relationship is corresponding to an infinity object-imaged through the freeform surface off-axial three-mirror imaging system, and the aperture is located at a first location; the T2 object-image relationship is corresponding to an object with a distance of 125 mm from the freeform surface off-axial three-mirror imaging system, and the aperture is located at a second location. For the T1 and T2 object-image relationships, the feature field of views and feature rays are selected according to a same rule.

Figure 2:
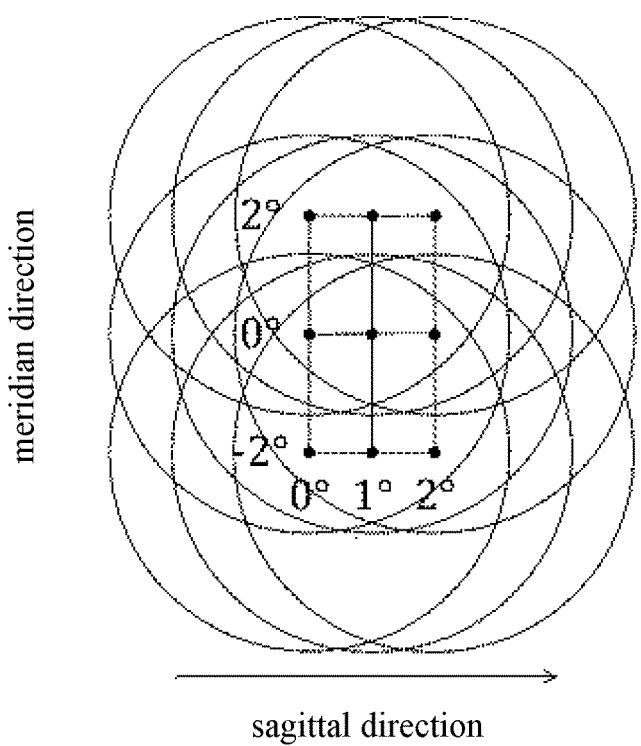
FIG. 2 is a schematic diagram showing a feature field of view selection rule according to one embodiment.

The number of the plurality of feature fields is much larger than the number of the initial surfaces of the initial system. In one embodiment, M feature fields are isometric sampled in sagittal direction and meridian direction, the M feature fields are defined as $\varphi_i$ (i=1, 2, ... M), and $(0, \varphi_{y0})$ is defined as a central field. A number of the feature fields is greater than a number of the initial surfaces, e.g., M is greater than L. Referring to FIG. 2, in one embodiment, the initial system is the initial planar three-mirror imaging system, in the T1 object-image relationship, a field of the initial planar three-mirror imaging system in meridian direction is from about −2° to about 2°, and a field of the initial planar three-mirror imaging system in sagittal direction is from about −2° to about 2°. The initial planar three-mirror imaging system is symmetric about a YOZ plane, thus, only half of the field in the sagittal direction can be considered. Three same feature fields are sampled in the sagittal direction, three same feature fields are sampled in the meridian direction, and nine feature fields are selected.

Figure 3:
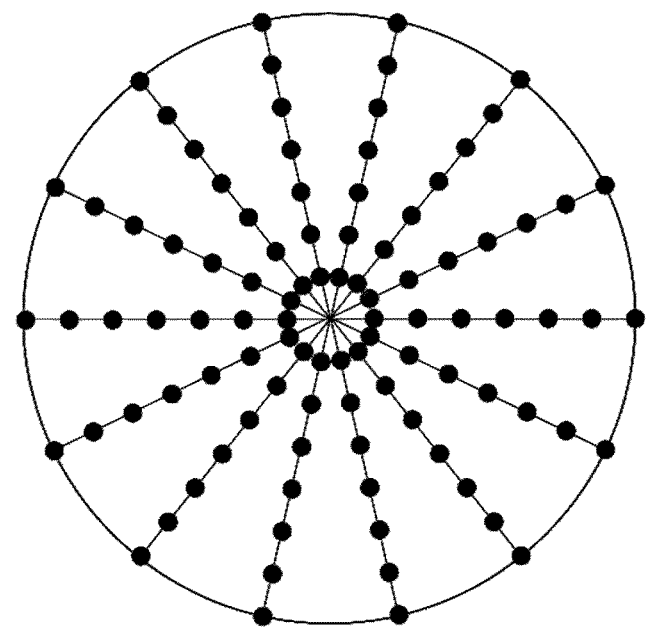
FIG. 3 is a method diagram of one embodiment of selecting feature fields according to different fields of view.

K feature rays are selected in each of the M feature fields. A method of selecting the K feature rays comprises steps of: an aperture of each of the M fields is divided into N equal parts; and, P feature rays at different aperture positions in each of the N equal parts are selected. As such, K=M×N×P different feature rays correspond to different aperture positions and different fields are selected. The aperture can be circle, rectangle, square, oval or other shapes. In one embodiment, the aperture of each of the M fields is a circle, and a circular aperture of each of the M fields is divided into N angles with equal interval $\varphi$, as such, N=2π/$\varphi$; then, P different aperture positions are fixed along a radial direction of each of the N angles. Therefore, K=M×N×P different feature rays correspond to different aperture positions and different fields are selected. Referring to FIG. 3, in one embodiment, the aperture of each field is divided into 14 equal parts; and, 7 feature rays at different aperture positions in each of the 14 equal parts are selected. As such, 98 different feature rays are selected in each field. And, each object-image relationship has 9×98=882 feature rays, and two object-image relationships have 882×2=1764 feature rays.

In step S2, the initial system comprises L initial surfaces, and the L initial surfaces are defined as $L_j$(j=1, 2, ... L). Step S2 comprises the steps of: step (S21), selecting a T1 object-image relationship from the T object-image relationships, and constructing an initial surface $L_1$ into a freeform surface $N_1$ using the T1 object-image relationship;

step (S22), moving the aperture to a location corresponding to a T2 object-image relationship from the T object-image relationships, searching for a best focal plane of the T2 object-image relationship, the astigmatism RMS radius of the field of view is minimum in the best focal plane position, intersections of the chief feature rays of the field of view and the best focal plane are the ideal image points of the T2 object-image relationship, reconstructing the free surface N1 to a free surface N1' using the feature rays of the two object-image relationships;

step (S23), repeating steps (S21) and (S22), finding best focal planes and ideal image points of T object-image relationships, reconstructing freeform surfaces using feature rays of the T object-image relationships;

step (S24), using the feature rays of the T object-image relationships to construct $L_j$(j=3, ... L) initial surfaces to $N_i$(j=3, ... L) freeform surfaces.

In step (S21), a method of constructing the initial surface $L_1$ into the freeform surface $N_i$ in the T1 object-image relationship comprises: calculating a plurality of feature data points $P_i$ (i=1, 2 ... K) on the freeform surface $N_1$; and surface fitting the plurality of feature data points to obtain an equation of the freeform surface $N_1$.

A surface $\Omega$ is defined as the freeform surface $N_1$, a surface $\Omega'$ is defined as a surface located adjacent to and before the surface $\Omega$, and a surface $\Omega''$ is defined as a surface located adjacent to and after the surface $\Omega$. The intersections of the plurality of feature rays $R_i$ (i=1, 2 ... K) with the surface $\Omega$ are defined as the first feature data points $P_i$ (i=1, 2 ... K). The plurality of feature rays $R_i$ (i=1, 2 ... K) are intersected with the surface $\Omega'$ at a plurality of start points $S_i$ (i=1, 2 ... K), and intersected with the surface $\Omega''$ at a plurality of end points $E_i$ (i=1, 2 ... K). When the surface $\Omega$ and the plurality of feature rays $R_i$ (i=1, 2 ... K) are determined, the plurality of start points $S_i$ (i=1, 2 ... K) of the feature rays $R_i$ (i=1, 2 ... K) can also be determined. The plurality of end points $E_i$ (i=1, 2 ... K) can also be obtained based on the object image relationship or given mapping relationship. Under ideal conditions, the feature rays $R_i$ (i=1, 2 ... K) emitted from the plurality of start points $S_i$ (i=1, 2 ... K) on the surface $\Omega'$; pass through the first feature data points $P_i$ (i=1, 2 ... K) on the surface $\Omega$; intersect with the surface $\Omega''$ at the plurality of end points $E_i$ (i=1, 2 ... K); and finally intersect with the image plane at the plurality of ideal target points $T_{i,ideal}$ (i=1, 2 ... K). If the surface $\Omega''$ is the target plane, the plurality of end points $E_i$ (i=1, 2 ... K) are the plurality of ideal target points $I_i$ (i=1, 2 ... K). If there are other surfaces between the surface $\Omega$ and the target plane, the plurality of end points $E_i$ (i=1, 2 ... K) are the points on the surface $\Omega''$, which make the first variation of the optical path length between the first feature data points $P_i$ (i=1, 2 ... K) and their corresponding target points zero. $\delta S = \delta \int_{P_i}^{T_i} n ds = 0$, wherein ds is the differential elements of the optical path length along the plurality of feature rays $R_i$ (i=1, 2 ... K), n denotes the refractive index of the medium, and $\delta$ denotes a differential variation.

A method of calculating the plurality of feature data points $P_i$ (i=1, 2 ... K) comprises:

step (a): defining a first intersection of a first feature light ray $R_1$ and the initial surface as a feature data point $P_1$;

step (b): when an ith (1≤i≤K−1) feature data point $P_i$ (1≤i≤K−1) has been obtained, a unit normal vector $\vec{N}_i|$ at the ith (1≤i≤K−1) feature data point $P_i$ (1≤i≤K−1) can be calculated based on the vector form of Snell's law;

step (c): making a first tangent plane through the ith (1≤i≤K−1) feature data point $P_i$ (1≤i≤K−1), and (K−i) second intersections can be obtained by the first tangent plane intersecting with remaining (K−i) feature rays; a second intersection $Q_{i+1}$, which is nearest to the ith (1≤i≤K−1) feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith feature data point $P_i$ (1≤i≤K−1) is defined as $d_i$;

step (d): making a second tangent plane at (i−1) feature data points that are obtained before the ith feature data point $P_i$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the (i−1) third intersections and its corresponding feature data point form an intersection pair; the intersection pair, which has the shortest distance between a third intersection and its corresponding feature data point, is fixed; and the third intersection and the shortest distance is defined as $Q'_{i+1}$ and $d'_i$ respectively;

step (e): comparing $d_i$ and $d'_i$, if $d_i \leq d'_i$, $Q_{i+1}$ is taken as the next feature data point $P_{i+1}$ (1≤i≤K−1); otherwise, $Q'_{i+1}$ is taken as the next feature data point $P_{i+1}$ (1≤i≤K−1); and step (f): repeating steps from (b) to (e), until the plurality of feature data points $P_i$ (i=1, 2 . . . K) on $N_1$ freeform surface are all calculated.

In step (b), the unit normal vector $\vec{N_i}$ (1≤i≤K−1) at each of the feature data point $P_i$ (1≤i≤K−1) can be calculated based on the vector form of Snell's Law. When the freeform surface $N_1$ is a refractive surface, $$\vec{N_i} = \frac{n'\vec{r'_i} - n\vec{r_i}}{|n'\vec{r'_i} - n\vec{r_i}|} \qquad (1)$$

$$\vec{r_i} = \frac{\overrightarrow{P_i S_i}}{|\overrightarrow{P_i S_i}|}$$

is a unit vector along a direction of an incident ray for the freeform surface $N_1$;

$$\vec{r'_i} = \frac{\overrightarrow{E_i P_i}}{|\overrightarrow{E_i P_i}|}$$

is a unit vector along a direction for an exit ray of the first freeform surface; and n, n' is refractive index of a media before and after the freeform surface $N_1$ respectively.

Similarly, when the freeform surface $N_1$ is a reflective surface, $$\vec{N_i} = \frac{\vec{r'_i} - \vec{r_i}}{|\vec{r'_i} - \vec{r_i}|} \qquad (2)$$

The unit normal vector $\vec{N_i}$ at each of the plurality of feature data points $P_i$ (i=1, 2 . . . K) is perpendicular to the first tangent plane at each of the plurality of feature data points $P_i$ (i=1, 2 . . . K). Thus, the first tangent plane at each of the plurality of feature data points $P_i$ (i=1, 2 . . . K) can be obtained.

In one embodiment, the space of the initial system is defined as a first three-dimensional rectangular coordinates system. The propagation direction of beams is defined as a Z-axis, and the Z-axis is perpendicular to an XOY plane. A method of surface fitting the plurality of feature data points $P_i$ (i=1, 2 . . . K) comprises:

step (S211): surface fitting the plurality of feature data points $P_i$ (i=1, 2 . . . K) to a sphere in the first three-dimensional rectangular coordinates system, and obtaining a curvature c of the sphere and the center of curvature ($x_c$, $y_c$, $z_c$) corresponding to the curvature c of the sphere;

step (S212): defining the feature data point ($x_o$, $y_o$, $z_o$) corresponding to a chief ray of the central field angle among the entire field-of-view (FOV) as the vertex of the sphere, defining a second three-dimensional rectangular coordinates system by the vertex of the sphere as origin and a line passing through the center of curvature and the vertex of the sphere as a Z'-axis;

step (S213): transforming the coordinates ($x_i$, $y_i$, $z_i$) and the normal vector ($\alpha_i$, $\beta_i$, $\gamma_i$), of the plurality of feature data points $P_i$ (i=1, 2 . . . K) in the first three-dimensional rectangular coordinates system, into the coordinates ($x'_i$, $y'_i$, $z'_i$) and the normal vector ($\alpha'_i$, $\beta'_i$, $\gamma'_i$), of the plurality of feature data points $P_i$ (i=1, 2 . . . K) in the second three-dimensional rectangular coordinates system;

step (S214): fitting the plurality of feature data points $P_i$ (i=1, 2 . . . K) into a conic surface equation of a conic surface in the second three-dimensional rectangular coordinates system, based on the coordinates ($x'_i$, $y'_i$, $z'_i$) and the curvature c of the sphere, and obtaining the conic constant k; and step (S215): removing the coordinates and the normal vector of the plurality of first feature data points $P_i$ (i=1, 2 . . . K), on the conic surface in the second three-dimensional rectangular coordinates system, from the coordinates ($x'_i$, $y'_i$, $z'_i$) and the normal vector ($\alpha'_i$, $\beta'_i$, $\gamma'_i$), to obtain a residual coordinate and a residual normal vector; and fitting the residual coordinate and the residual normal vector to obtain a polynomial surface equation; the equation of the freeform surface $N_1$ can be obtained by adding the conic surface equation and the polynomial surface equation.

Generally, the imaging systems are symmetric about the YOZ plane. Therefore, the tilt angle θ of the sphere, in the Y'O'Z' plane of the second three-dimensional rectangular coordinates system relative to in the YOZ plane of the first three-dimensional rectangular coordinates system, is:

$$\theta = \arctan\left(\frac{y_o - y_c}{z_o - z_c}\right).$$

The relationship between the coordinates ($x'_i$, $y'_i$, $z'_i$) and the coordinates ($x_i$, $y_i$, $z_i$) of each of the plurality of feature data points $P_i$ (i=1, 2 . . . K) can be expressed as following:

$$\begin{cases} x'_i = x_i - x_o \\ y'_i = (y_i - y_o)\cos\theta - (z_i - z_o)\sin\theta \\ z'_i = (y_i - y_o)\sin\theta + (z_i - z_o)\cos\theta \end{cases}.$$

The relationship between the normal vector ($\alpha'_i$, $\beta'_i$, $\gamma'_i$) and the normal vector ($\alpha_i$, $\beta_i$, $\gamma_i$) of each of the plurality of feature data points $P_i$ (i=1, 2 . . . K) can be expressed as following:

$$\begin{cases} \alpha'_i = \alpha_i \\ \beta'_i = \beta_i\cos\theta - \gamma_i\sin\theta \\ \gamma'_i = \beta_i\sin\theta + \gamma_i\cos\theta \end{cases}.$$

In the second three-dimensional rectangular coordinates system, the coordinates and the normal vector of the plurality of feature data points $P_i$ (i=1, 2 . . . K) on the conic surface are defined as ($x'_i$, $y'_i$, $z'_{is}$) and ($\alpha'_i$, $\beta'_i$, $\gamma'_i$) respectively. The Z'-axis component of the normal vector is normalized to $-1$. The residual coordinate $(x''_i, y''_i, z''_i)$ and the residual normal vector $(\alpha''_i, \beta''_i, -1)$ can be obtained, wherein, $(x''_i, y''_i, z''_i) = (x'_i, y'_i, z'_i, z'_{is})$ and $$(\alpha''_i, \beta''_i, -1) = \left(-\frac{\alpha'_i}{\gamma'_i} + \frac{\alpha'_{is}}{\gamma'_{is}}, -\frac{\beta'_i}{\gamma'_i} + \frac{\beta'_{is}}{\gamma'_{is}}, -1\right).$$

In block (B215), a method of surface fitting the residual coordinate and the residual normal vector comprises:

in the second three-dimensional rectangular coordinates system, expressing a polynomial surface of the freeform surface off-axial three-mirror imaging system by the polynomial surface equation leaving out the conic surface term, the polynomial surface can be expressed in terms of the following equation:

$$z = f(x, y; P) = \sum_{j=1}^{J} P_j g_j(x, y),$$

wherein $g_j(x, y)$ is one item of the polynomial, and $P = (p_1, p_2, L, p_J)^T$ is the coefficient sets;

acquiring a first sum of squares $d_1(P)$, of residual coordinate differences in z' direction between the residual coordinate value $(x''_i, y''_i, z''_i)$ $(i=1, 2, \ldots, K)$ and the freeform surface; and a second sum of squares $d_2(P)$, of modulus of vector differences between the residual normal vector $N_i = (\alpha''_i, \beta''_i, -1)$ $(i=1, 2, \ldots, K)$ and a normal vector of the freeform surface, wherein the first sum of squares $d_1(P)$ is expressed in terms of a first equation:

$$d_1(P) = \sum_{i=1}^{I} [z_i - f(x''_i, y''_i; P)]^2 = (Z - A_1 P)^T (Z - A_1 P),$$

and the second sum of squares $d_2(P)$ is expressed in terms of a second equation:

$$d_2(P) = \sum_{i=1}^{I} \{[u_i - f_{x''}(x''_i, y''_i; P)]^2 + [v_i - f_{y''}(x''_i, y''_i; P)]^2\} =$$
$$(U - A_2 P)^T (U - A_2 P) + (V - A_3 P)^T (V - A_3 P)$$

wherein, $Z = (z_1, z_2, L, z_I)^T$, $U = (u_1, u_2, L, u_I)^T$, $V = (v_1, v_2, L, v_I)^T$, $$A_1 = \begin{pmatrix} g_1(x''_1, y''_1) & g_2(x''_1, y''_1) & \cdots & g_J(x''_1, y''_1) \\ g_1(x''_2, y''_2) & g_2(x''_2, y''_2) & \cdots & g_J(x''_2, y''_2) \\ \vdots & \vdots & & \vdots \\ g_1(x''_I, y''_I) & g_2(x''_I, y''_I) & \cdots & g_J(x''_I, y''_I) \end{pmatrix},$$

$$A_2 = \begin{pmatrix} g_1^x(x''_1, y''_1) & g_2^x(x''_1, y''_1) & \cdots & g_J^x(x''_1, y''_1) \\ g_1^x(x''_2, y''_2) & g_2^x(x''_2, y''_2) & \cdots & g_J^x(x''_2, y''_2) \\ \vdots & \vdots & & \vdots \\ g_1^x(x''_I, y''_I) & g_2^x(x''_I, y''_I) & \cdots & g_J^x(x''_I, y''_I) \end{pmatrix},$$

-continued $$A_3 = \begin{pmatrix} g_1^y(x''_1, y''_1) & g_2^y(x''_1, y''_1) & \cdots & g_J^y(x''_1, y''_1) \\ g_1^y(x''_2, y''_2) & g_2^y(x''_2, y''_2) & \cdots & g_J^y(x''_2, y''_2) \\ \vdots & \vdots & & \vdots \\ g_1^y(x''_I, y''_I) & g_2^y(x''_I, y''_I) & \cdots & g_J^y(x''_I, y''_I) \end{pmatrix};$$

obtaining an evaluation function, $$P = (A_1^T A_1 + w A_2^T A_2 + w A_3^T A_3)^{-1} \cdot (A_1^T Z + w A_2^T U + w A_3^T V),$$

wherein w is a weighting greater than 0;

selecting different weightings w and setting a gradient $\nabla f(P)$ of the evaluation function equal to 0, to obtain a plurality of different values of P and a plurality of freeform surface shapes $z = f(x, y; P)$ corresponding to each of the plurality of different values of P;

choosing a final freeform surface shape $\Omega_{opt}$ which has a best imaging quality from the plurality of freeform surface shapes $z = f(x, y; P)$; and obtaining the freeform surface having a best imaging quality.

The methods of constructing other initial surfaces of the initial system into the freeform surfaces are substantially the same as the method of constructing the freeform surface $N_1$, except that the object-image relationships are different. Methods of calculating the feature data points on other freeform surfaces are the same as the method of calculating the feature data points on freeform surface $N_1$. Methods of surface fitting the plurality of feature data points on other freeform surfaces are the same as the method of fitting the plurality of feature data points on the freeform surface $N_1$.

Step S3 comprises:

S31, applying the free-form surface system obtained in step S2 as an initial system, and the intersection of the feature rays and the free form surface of all object-image relationships as the feature points;

S32, calculating normal vectors of the feature points on the free form surface according to a vector form of Snell's law, and fitting the feature points into a free form surface;

S33, constructing L new free form surfaces to get a new free form system from the L free form surfaces in the free form surface system of step S2, and then using the new free form system as an initial system; and S34, repeating steps S31 to S33 from multiple times until the average RMS spot is no longer diffusing.

In step S31, the intersections of the feature and the freeform surface $N_1$ can be obtained by Snell's law and object-image relationship. The intersections are the feature data points on the freeform surface $N'_1$. Solving a normal vector at each feature data point based on the object-image relationship, and surface fitting the plurality of feature data points to obtain an equation of the freeform surface $N'_1$. A method of surface fitting the plurality of feature data points to obtain the equation of the freeform surface $N'_1$ is the same as the method of fitting the plurality of feature data points $P_i (i=1, 2 \ldots K)$ to obtain the equation of the freeform surface $N_1$ in step S2.

Furthermore, a step of optimizing the freeform surface off-axial three-mirror imaging system obtained in step S3 by using the freeform surface off-axial three-mirror imaging systems as an initial system of optimization can be performed.

In one embodiment, after step S3, further comprises enlarge the freeform surface off-axis imaging system by a certain multiple.

In one embodiment, after the freeform surface off-axial three-mirror imaging system is designed, further manufacturing the freeform surface off-axial three-mirror imaging system.

Freeform surface off-axial imaging systems with large relative aperture and wide field can be obtained by the above method of designing the freeform surface off-axial three-mirror imaging system. Furthermore, an aberration compensation for the constructed feature field can be performed in the process of expanding the construction feature field, and thus an image quality of the freeform surface off-axial three-mirror imaging system is improved.

Depending on the embodiment, certain blocks/steps of the methods described may be removed, others may be added, and the sequence of blocks may be altered. It is also to be understood that the description and the claims drawn to a method may comprise some indication in reference to certain blocks/steps. However, the indication used is only to be viewed for identification purposes and not as a suggestion as to an order for the blocks/steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of designing a freeform surface off-axial three-mirror imaging system comprising:
   step (S1), establishing an initial system and T object-image relationships according to a design goal, and selecting M feature fields for each of the object-image relationships, wherein the initial system comprises L initial surfaces $L_j$, j is equal to 1, 2, ... L, M is greater than L, and T is equal to or greater than 2;
   step (S2), using feature rays of the T object-image relationships to construct a freeform surface system by using the initial system;
   step (S3), repeating the step (S1) by using the freeform surface system obtained in the step (S2) as a new initial system, reducing a deviation between actual intersection points and ideal target points of the feature rays and feature surfaces by iteratively reconstructing free-form surfaces in the free-form surface system, until an average RMS (root mean square) dispersion spot is no longer shrinking, the freeform surface off-axial three-mirror imaging system to be designed is obtained.

2. The method of claim 1, wherein in step S1, the initial system comprises an initial primary mirror, an initial secondary mirror, an initial tertiary mirror and an aperture.

3. The method of claim 2, wherein the aperture is located on a surface of the initial secondary mirror, and is adapted for moving from a first location and a second location on a surface of the initial secondary.

4. The method of claim 3, wherein in step S1, two object-image relationships are selected from the object-image relationships, a T1 object-image relationship is corresponding to an infinity object from the freeform surface off-axial three-mirror imaging system, and the aperture is located at the first location; a T2 object-image relationship is corresponding to an object with a distance of 125 mm from the freeform surface off-axial three-mirror imaging system, and the aperture is located at a second location.

5. The method of claim 4, wherein in the T1 object-image relationship, a field of the initial planar three-mirror imaging system in meridian direction is from approximately −2° to approximately 2°, and a field of the initial planar three-mirror imaging system in sagittal direction is from approximately −2° to approximately 2°.

6. The method of claim 1, wherein in step S1, K feature rays are selected in each of the M feature fields, a method of selecting the K feature rays comprises steps of: an aperture of each of the M feature fields is divided into N equal parts; and, P feature rays at different aperture positions in each of the N equal parts are selected.

7. The method of claim 4, wherein step S2 comprises steps of:
   step (S21), selecting a T1 object-image relationship from the T object-image relationships, and constructing an initial surface $L_1$ into a freeform surface $N_1$ using the T1 object-image relationship;
   step (S22), moving the aperture to a location corresponding to a T2 object-image relationship from the T object-image relationships, searching for a best focal plane of the T2 object-image relationship, wherein the astigmatism RMS radius of the field of view is minimum in the best focal plane position, intersections of the chief feature rays of the field of view and the best focal plane are an ideal image points of the T2 object-image relationship, reconstructing the free surface N1 to a free surface N1' using the feature rays of the two object-image relationships;
   step (S23), repeating steps (S21) and (S22), finding the best focal planes and the ideal image points of T object-image relationships, reconstructing freeform surfaces using feature rays of the T object-image relationships;
   step (S24), using the feature rays of the T object-image relationships to construct $L_j$(j=3, ... L) initial surfaces to $N_i$ (i=3, ... L) freeform surfaces.

8. The method of claim 7, wherein in step (S21), a method of constructing the initial surface $L_1$ into the freeform surface $N_1$ in the T1 object-image relationship comprises: calculating a plurality of feature data points $P_i$ (i=1, 2 ... K) on the freeform surface $N_1$; and surface fitting the plurality of feature data points to obtain an equation of the freeform surface $N_1$.

9. The method of claim 8, wherein a method of calculating the plurality of feature data points $P_i$ (i=1, 2 ... K) comprises:
   step (a): defining a first intersection of a first feature light ray $R_1$ and the initial surface as a feature data point $P_1$;
   step (b): when an ith (1≤i≤K−1) feature data point $P_i$ (1≤i≤K−1) has been obtained, a unit normal vector $\vec{N}_i|$ at the ith (1≤i≤K−1) feature data point $P_i$ (1≤i≤K−1) can be calculated based on the vector form of Snell's law;
   step (c): making a first tangent plane through the ith (1≤i≤K−1) feature data point $P_i$ (1≤i≤K−1), and (K−i) second intersections can be obtained by the first tangent plane intersecting with remaining (K−i) feature rays; a second intersection $Q_{i+1}$, which is nearest to the ith (1≤i≤K−1) feature data point $P_i$ (1≤i≤K−1), is fixed; and a feature ray corresponding to the second intersection $Q_{i+1}$ is defined as $R_{i+1}$, a shortest distance between the second intersection $Q_{i+1}$ and the ith feature data point $P_i$ (1≤i≤K−1) is defined as $d_i$;

step (d): making a second tangent plane at (i−1) feature data points that are obtained before the ith feature data point $P_i$ (1≤i≤K−1) respectively; thus, (i−1) second tangent planes can be obtained, and (i−1) third intersections can be obtained by the (i−1) second tangent planes intersecting with a feature ray $R_{i+1}$; in each of the (i−1) second tangent planes, each of the (i−1) third intersections and its corresponding feature data point form an intersection pair; the intersection pair, which has the shortest distance between a third intersection and its corresponding feature data point, is fixed; and the third intersection and the shortest distance is defined as $Q'_{i+1}$ and $d'_i$ respectively;

step (e): comparing $d_i$ and $d'_i$, if $d_i \leq d'_i$, $Q_{i+1}$ is taken as the next feature data point $P_{i+1}$ (1≤i≤K−1); otherwise, $Q'_{i+1}$ is taken as the next feature data point $P_{i+1}$ (1≤i≤K−1); and step (f): repeating steps from (b) to (e), until the plurality of feature data points $P_i$ (i=1, 2 . . . K) on N1 freeform surface are all calculated.

10. The method of claim 9, wherein in step (b), the unit normal vector $\vec{N}_i$ (1≤i≤K−1) at each of the feature data point $P_i$ (1≤i≤K−1) is calculated based on the vector form of Snell's Law, wherein if the freeform surface $N_1$ is a refractive surface, $$\vec{N}_i = \frac{n'\vec{r'_i} - n\vec{r_i}}{|n'\vec{r'_i} - n\vec{r_i}|} \quad (1)$$

$$\vec{r_i} = \frac{\vec{P_i S_i}}{|\vec{P_i S_i}|}$$

is a unit vector along a direction of an incident ray for the freeform surface $N_1$;

$$\vec{r'_i} = \frac{\vec{E_i P_i}}{|\vec{E_i P_i}|}$$

is a unit vector along a direction for an exit ray of the first freeform surface; and n, n' is refractive index of a media before and after the freeform surface $N_1$ respectively.

11. The method of claim 10, wherein a method of surface fitting the plurality of feature data points $P_i$ (i=1, 2 . . . K) comprises:

step (S211): surface fitting the plurality of feature data points $P_i$ (i=1, 2 . . . K) to a sphere in the first three-dimensional rectangular coordinates system, and obtaining a curvature c of the sphere and the center of curvature $(x_c, y_c, z_c)$ corresponding to the curvature c of the sphere;

step (S212): defining the feature data point $(x_o, y_o, z_o)$ corresponding to a chief ray of the central field angle among an entire field-of-view (FOV) as the vertex of the sphere, defining a second three-dimensional rectangular coordinates system by the vertex of the sphere as origin and a line passing through the center of curvature and the vertex of the sphere as a Z'-axis;

step (S213): transforming the coordinates $(x_i, y_i, z_i)$ and the normal vector $(\alpha_i, \beta_i, \gamma_i)$, of the plurality of feature data points $P_i$ (i=1, 2 . . . K) in the first three-dimensional rectangular coordinates system, into the coordinates $(x'_i, y'_i, z'_i)$ and the normal vector $(\alpha'_i, \beta'_i, \gamma'_i)$, of the plurality of feature data points $P_i$ (i=1, 2 . . . K) in the second three-dimensional rectangular coordinates system;

step (S214): fitting the plurality of feature data points $P_i$ (i=1, 2 . . . K) into a conic surface equation of a conic surface in the second three-dimensional rectangular coordinates system, based on the coordinates $(x'_i, y'_i, z'_i)$ and the curvature c of the sphere, and obtaining the conic constant k; and step (S215): removing the coordinates and the normal vector of the plurality of first feature data points $P_i$ (i=1, 2 . . . K), on the conic surface in the second three-dimensional rectangular coordinates system, from the coordinates $(x'_i, y'_i, z'_i)$ and the normal vector $(\alpha'_i, \beta'_i, \gamma'_i)$, to obtain a residual coordinate and a residual normal vector; and fitting the residual coordinate and the residual normal vector to obtain a polynomial surface equation; the equation of the freeform surface $N_1$ can be obtained by adding the conic surface equation and the polynomial surface equation.

12. The method of claim 1, wherein step S3 comprises:

S31, applying the free-form surface system obtained in step S2 as an initial system, and the intersection of the feature rays and the free form surface of all of the object-image relationships as the feature points;

S32, calculating normal vectors of the feature points on the free form surface according to a vector form of Snell's law, and fitting the feature points into a free form surface;

S33, constructing L new free form surfaces to get a new free form system from the L free form surfaces in the free form surface system of step S2, and then using the new free form system as an initial system; and S34, repeating steps S31 to S33 from multiple times until the average RMS spot is no longer diffusing.

13. The method of claim 12, wherein in step S31, the intersections of the feature and the freeform surface $N_1$ can be obtained by Snell's law and object-image relationship.

14. The method of claim 1, wherein a step of optimizing the freeform surface off-axial three-mirror imaging system obtained in step S3 by using the freeform surface off-axial three-mirror imaging systems as an initial system of optimization is performed.

15. The method of claim 1, wherein after step S3, further comprises enlarging the freeform surface off-axis imaging system by a certain multiple.

* * * * *